Nov. 18, 1924.  1,516,378

G. B. DICKSON

RESILIENT WHEEL

Filed Dec. 3, 1923

Inventor

George B. Dickson,

By [signature]

Attorney

Patented Nov. 18, 1924.

1,516,378

UNITED STATES PATENT OFFICE.

GEORGE B. DICKSON, OF IKE, MISSOURI, ASSIGNOR OF ONE-HALF TO JOHN DICKSON, OF MANSFIELD, OHIO.

RESILIENT WHEEL.

Application filed December 3, 1923. Serial No. 678,280.

*To all whom it may concern:*

Be it known that GEORGE B. DICKSON, a citizen of the United States, residing at Ike, in the county of Taney and State of Missouri, has invented new and useful Improvements in Resilient Wheels, of which the following is a specification.

The purpose of this invention is to provide, in a resilient wheel, a spoke construction comprising two yieldably united sections connecting the hub and the rim of the wheel in such wise as to accommodate itself to the rim and the hub during their relative movements while the wheel is in the act of rotating and traveling over irregular roadbeds, thereby eliminating the use of pneumatic tires.

Another purpose is the provision of means between the spokes adjacent where they are pivotally connected to the hub to not only preclude dirt and other foreign matter from between the sides of the hub but also permitting of yielding actions of the spokes incident to the rim moving relatively to the hub, and vice versa.

Still another purpose is the provision of a resilient spoke comprising two telescopical sections, one carried by the hub and the other by the rim, there being yieldable connections between the two sections, allowing them to move relatively to each other, in conjunction with a stuffing box carried by one section for the purpose of precluding foreign matter from the hollow section which would retard the action of the sections.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 1:
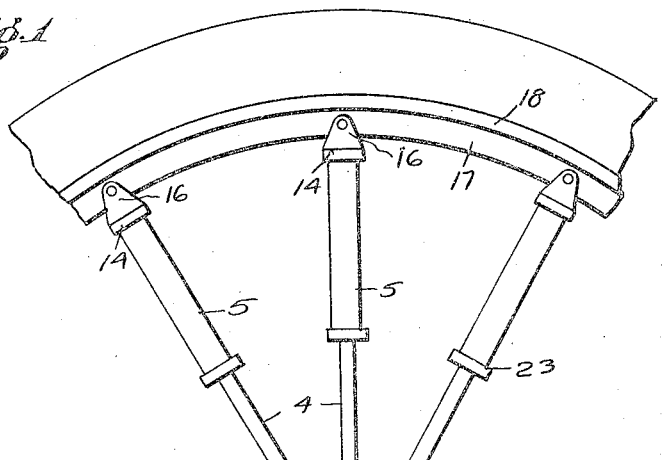
Figure 1 is a view in side elevation of a section or portion of an automobile wheel, the same being constructed in accordance with the invention.
Figure 2:
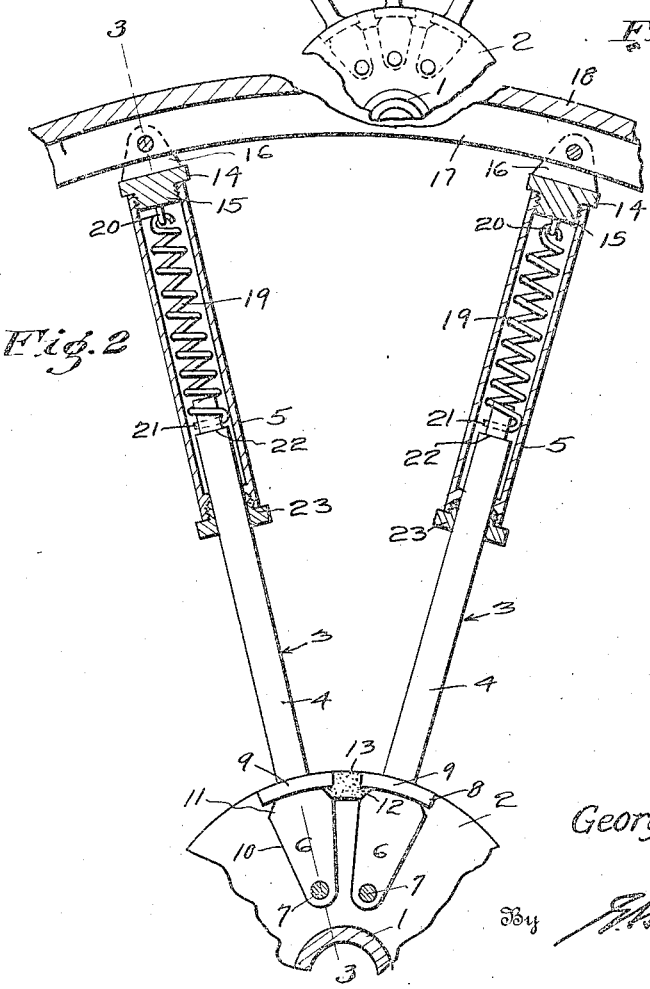
Figure 2 is an enlarged longitudinal sectional view through a pair of spokes and a portion of the rim, showing the interior construction of the spokes.
Figure 3:
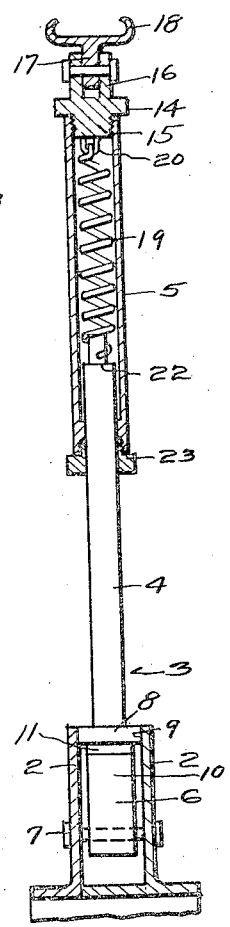
Figure 3 is a longitudinal sectional view through one of the spokes, on line 3—3 of Figure 2.

Referring to the drawings, 1 designates a hub which comprises a central body of any suitable or conventional construction including a bore for the reception of an axle spindle, and extending from this central body are spaced flanges 2, and the spokes 3 of a wheel. Each spoke 3 comprises two sections 4 and 5. The former of said sections is solid throughout its length and telescopes in the latter which is tubular.

The inner end of the section 4 of the spoke terminates in a base 6 which is tapered or V-shaped in side elevation, as shown. The bases of the sections 4 of the spokes are pivoted upon transverse bolts 7 which extend through the hub flanges and are provided with nuts to retain them in place. The larger end of each base has a marginal flange 8, the opposite sides 9 of which are arcuate conforming to the circular contour of the peripheral edges of the flanges 2 of the hub. The side portions 9 of the flange assume positions relatively close to the edges of the flanges 2 of the hub but not enough to cause any frictional contact which might retard the pivotal actions of the spokes during the revoluble movements of the wheel.

The sides 10 of the larger portion of each base have transverse grooves 11 V-shaped in cross section which receive the V-shaped ends 12 of the cushions 13 which may be constructed of any suitable resilient material, preferably rubber or a composition thereof and which are interposed between the side flanges 2 of the hub. The cushions 13 fit snugly between the flanges and as a result of the spokes substantially at the diametrically opposite sides of the wheel moving pivotally toward and from each other, they are compressed and allowed to expand so as to return the spokes to their normal positions when pressure is relieved upon the hub. The cushions also serve to preclude dirt and other foreign matter from entering between the flanges of the hub.

The tubular sections 5 of the spokes at their outer ends are engaged by connectors 14. The outer ends of the tubular sections of the spokes are threaded to extensions 15 which form integral parts of the connectors 14. Each connector is slotted and its ears 16 straddle the rib 17 which forms an integral part of the inner face of the rim 18 of the wheel. Each connector is pivoted to the rib in such wise as to dispose the base of the connector a substantial distance from the inner periphery of the rib in order to permit the connector to have pivotal movement as a result of the hub moving relatively to the rim during the action of the wheel.

Located on the interior of the tubular sections of the spokes are coil springs 19, the outer ends of which are connected to eyes 20 which are carried by the connectors. The inner ends of the springs as indicated at 21, are connected to reduced portions of the solid sections 4 in order to stretch the springs at the top of the wheel when the hub moves downwardly. The solid sections of the spokes have annular shoulders 22 against which the coil springs bear so as to compress the springs on the spokes at the bottom of the wheel when the hub moves downwardly.

The inner end of the tubular sections of each spoke has a stuffing gland or box 23 which is threaded to the tubular section of the spoke and through which the solid section of the spoke passes. By means of the packing or stuffing gland, dust, dirt and other foreign matter is precluded from entering the tubular portion of the spoke.

The invention having been set forth, what is claimed is:

1. In a resilient wheel, the combination with a hub provided with a spaced flanges, of a rim, spokes pivotally connected to the rim, said spokes comprising inner and outer telescopical sections, the inner ends of the inner sections being pivotally connected between the flanges of the hub, cushioning means disposed between the flanges of the hub and interposed between the several inner sections of the spokes, the inner sections of the spokes having opposite shoulders or flanges of arcuate form conforming to the flanges of the hub, and resilient means connecting between the sections of the spokes.

2. In a resilient wheel, a hub, a rim, extensible, yieldable spokes connected at their outer ends to the rim and having their inner ends pivotally connected to the hub, and cushioning means carried by the hub and interposed between the spokes, the inner portions of the spokes having opposite shoulders of arcuate form conforming to the periphery of the hub.

3. In a resilient wheel, a hub having spaced annular flanges, a rim, extensible, yieldable spokes connected at their outer ends to the rim, the inner ends of the spokes having enlargements V-shaped in side elevation and being pivoted between the flanges of the hub, the larger portions of the enlargements having shoulders of arcuate form conforming to the curvature of the edge of the hub, said enlargements at right angles to the shoulders having V-shaped recesses, and cushioning means interposed between the enlargements of the spokes and engaging said recesses, acting to permit the spokes to yield and to preclude foreign matter from between the flanges of the hub.

In testimony whereof he affixes his signature.

GEORGE B. DICKSON.